Jan. 4, 1944.  R. R. BARNES  2,338,310
BOTTLE RACK
Filed July 19, 1943  2 Sheets-Sheet 1
Fig. 1.
Fig. 2.
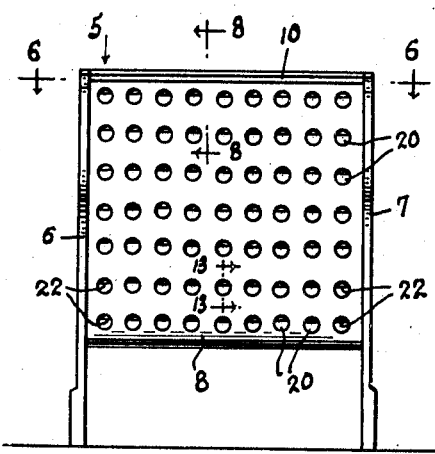
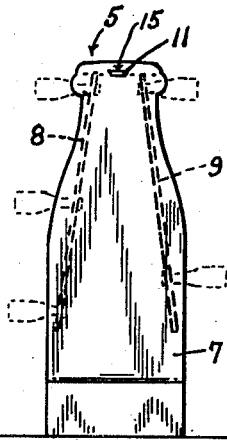
Fig. 3.
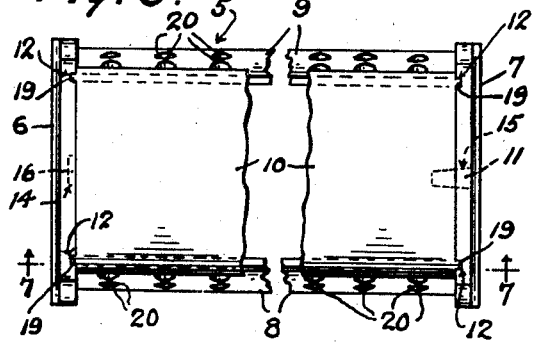
Fig. 4.  Fig. 5.
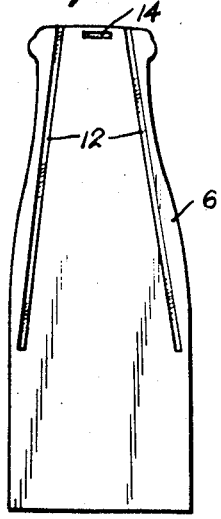
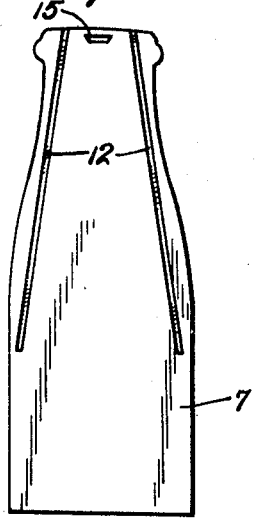
Fig. 6.
Fig. 7.
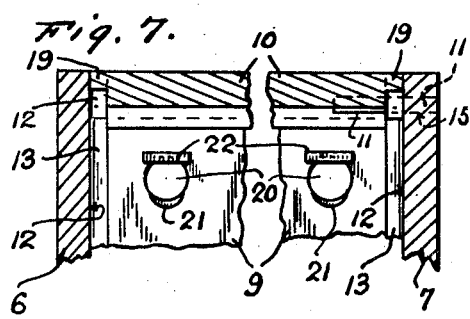
Inventor
Rendell R. Barnes
By L. B. James
Attorney Jan. 4, 1944. R. R. BARNES 2,338,310
BOTTLE RACK
Filed July 19, 1943 2 Sheets-Sheet 2
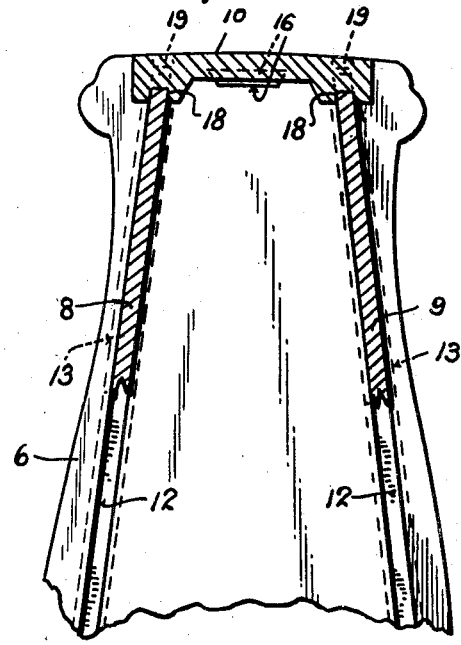
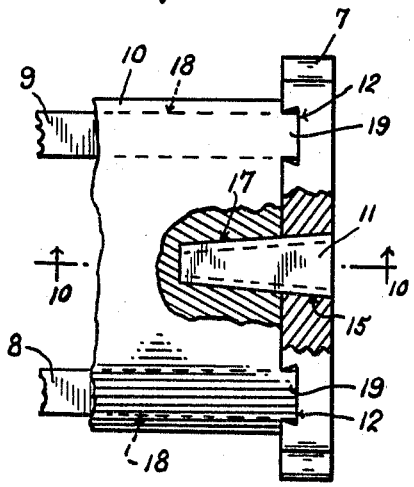
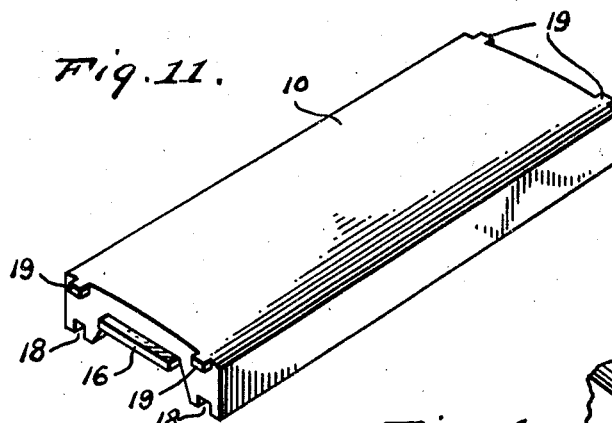
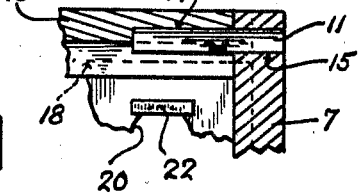
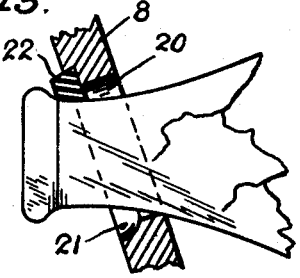
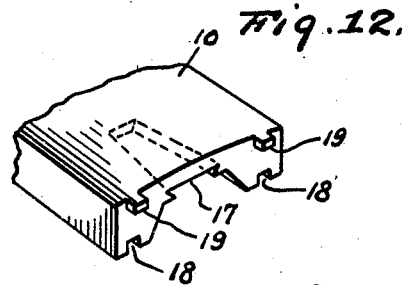
Inventor
Rendell R. Barnes
By L. B. James
Attorney Patented Jan. 4, 1944

2,338,310

UNITED STATES PATENT OFFICE 2,338,310

BOTTLE RACK

Rendell R. Barnes, Fort Worth, Tex.

Application July 19, 1943, Serial No. 495,326

1 Claim. (Cl. 211—74)

This invention relates to store equipment and more particularly a bottle rack.

The primary object of this invention resides in the provision of a rack adapted to receive empty bottles and the like when returned to stores.

Another object of this invention resides in the provision of a bottle rack preferably constructed from sections formed of a cheap plastic material and secured together by a single locking number.

A further object of this invention resides in the particular manner of constructing the sections so as to form interlocking joints therebetween.

A still further object of this invention resides in the particular construction of the end sections.

Aside from the aforesaid objects this invention resides in the particular construction of the panels and manner of removably connecting them to the side sections.

In addition to the above objects this invention resides in the particular constructed top section and manner of engaging the side sections and top edges of the side panels.

Among the salient features of this invention is the manner of forming the wedge-shape groove in the top section and aligning it with the wedge-shaped slot in one end section so as to accommodate the wedge.

With these and other objects in view this invention resides in certain novel features of construction and arrangement of elements to be hereinafter more particularly set forth in the specification, illustrated in the accompanying drawings and pointed out in the appended claim and, while this disclosure depicts my present conception of the invention, the right is reserved to resort to such changes as come within the spirit of the invention.

In the accompanying drawings forming a part of this application:

Fig. 1 is a front view of a bottle rack constructed in accordance with this invention.

Fig. 2 is a side view thereof.

Fig. 3 is an enlarged plan view thereof partly broken away.

Figs. 4 and 5 are inside views of the end sections.

Fig. 6 is an enlarged horizontal sectional view taken approximately on line 6—6 of Fig. 1.

Fig. 7 is an enlarged vertical sectional view taken approximately on line 7—7 of Fig. 3.

Fig. 8 is an enlarged sectional view taken approximately on line 8—8 of Fig. 1.

Fig. 9 is an enlarged plan view partly in section of the wedge secured end of the rack.

Fig. 10 is a vertical sectional view approximately on line 10—10 of Fig. 9.

Fig. 11 is a perspective view of the top section of the rack looking from one end.

Fig. 12 is a similar view looking from the opposite end of the top section.

Fig. 13 is an enlarged vertical sectional view approximately on line 13—13 of Fig. 1.

Fig. 14 is a perspective view of the locking wedge.

In the present embodiment of this invention the numeral 5 designates, in general, a bottle rack consisting of end sections 6 and 7, front and rear panels 8 and 9, a cap or top section 10 and a locking wedge 11 all of which, except the wedge, is preferably formed of a cheap and strong plastic material; however, it is within the purview of this invention to use any material found appropriate in carrying out the salient features of the invention.

Each of the end sections 6 and 7 are provided with dove-tail grooves 12 in their opposed inner surfaces, the same diverge from the upper ends of the sections and are adapted to receive wedge-shape tongues 13 formed on the side edges of the front and rear panels to secure the panels and sections together.

Formed in the inner surface of the end section 6 adjacent the upper end thereof is a substantially rectangular groove 14 while formed in the end section 7 adjacent its upper end is a wedge-shaped slot 15, the former of which is adapted to receive a tongue 16 formed on one end of the top section whereas the latter of which is adapted to align with a wedge-shaped groove 17 formed in the opposite end of the top section to accommodate the wedge 11 driven tightly therein to secure the sections rigidly together.

The top section is provided with grooves 18 in its lower surface to receive the upper edges of the panels 8 and 9 and thereby retain them tightly in the grooves 12 upon driving the wedge 11 into locking position.

Extending from the opposite ends of the top section are lugs 19 adapted to enter the upper ends of the grooves 12 to close the same and conceal the tongues 13 therebeneath.

Formed in the panels 8 and 9 is a plurality of apertures 20 having their lower areas cut out as indicated by the numeral 21 to permit the annular neck flanges of large bottles to enter the apertures and lodge behind suitable retaining members 22 secured to the upper inner walls of the apertures and, through the instrumentality of the aforesaid elements, bottles having their necks inserted into the apertures 20 will extend from the panels approximately on horizontal planes.

With the aforesaid sections of the rack constructed as set forth, it is simply necessary to slide the tongues 13 on opposite sides of the panels into the grooves 12 in the end sections, insert the tongue 16 on one end of the top section in the groove 14 and push the top section downwardly to seat the upper edges of the panels in the grooves 18 thereof whereupon the wedge-shape slot 15 and groove 17 will become aligned so the wedge 11 can be driven home to rigidly secure the sections together.

Through the provision of a bottle rack of this character, customers returning empty bottles to a store will insert the necks thereof in the apertures 20 with little or no effort and when releasing their hold on the bottles, the neck flanges thereof will lodge behind the element 22 and hold the bottles approximately on horizontal lines where they can be easily and quickly removed from the rack by tilting them a slight degree upwardly.

Although the rack is herein shown in the general shape of a milk bottle, it is to be understood other designs may be employed in practicing the invention without departing from the salient features thereof.

With this invention fully described it is manifest a bottle rack is provided which will materially add to the neatness of stores and the like and, through the simplicity of construction thereof, it can be manufactured and sold cheaply, shipped in knock-down condition and assembled by anyone with use of a hammer or the like.

Having thus described my invention what I claim and desire to protect by Letters Patent is:

A bottle rack comprising end sections having downwardly diverging dove-tail grooves in their opposed inner surfaces, panels having a plurality of bottle neck receiving apertures therein disposed between the opposed surfaces of the end sections, wedge-shaped tongues formed on the side edges of the panels and removably engaging the dove-tail grooves in the end sections, bottle retaining members secured to the upper walls of the apertures in the panels and extending across the upper portion of the apertures, a top section having grooves in its lower surface receiving the upper edges of the panels, a tongue on one end of the top section engaging an elongated groove in the upper inner surface of one side section, lugs on the opposite ends of the top section disposed in the upper portions of the diverging grooves in the side sections, and a wedge extending through a wedge-shaped slot in the other side section into a wedge-shaped groove in said end of the top section.

RENDELL R. BARNES.